United States Patent [19]

Peters et al.

[11] Patent Number: 6,090,860

[45] Date of Patent: *Jul. 18, 2000

[54] METHODS OF RECYCLING AND COMPOSITIONS USED THEREIN

[75] Inventors: Donald S. Peters, Mentor; Randall J. Brent, Solon, both of Ohio

[73] Assignee: PPG Industries Ohio, Inc., Cleveland, Ohio

[ * ] Notice: This patent is subject to a terminal disclaimer.

[21] Appl. No.: 09/193,545

[22] Filed: Nov. 17, 1998

Related U.S. Application Data

[62] Division of application No. 08/715,603, Sep. 18, 1996, Pat. No. 5,840,772.

[51] Int. Cl.$^7$ ...................................... C08J 11/04
[52] U.S. Cl. .................... 521/48; 521/48.5; 521/40; 521/40.5; 521/41; 528/488; 528/491; 528/499; 528/502
[58] Field of Search ................ 521/48, 48.5, 40, 521/40.5, 41; 528/488, 491, 499, 502

[56] References Cited

U.S. PATENT DOCUMENTS

| | | |
|---|---|---|
| 4,152,176 | 5/1979 | Guhde . |
| 4,165,242 | 8/1979 | Kelly . |
| 4,338,140 | 7/1982 | Reghi . |
| 4,348,294 | 9/1982 | King . |
| 4,496,404 | 1/1985 | King . |
| 4,537,705 | 8/1985 | Mahoney . |
| 4,573,429 | 3/1986 | Cobbs, Jr. et al. ............... 118/322 |
| 4,590,014 | 5/1986 | Wolf . |
| 4,594,176 | 6/1986 | Mahoney et al. . |
| 4,597,888 | 7/1986 | King . |
| 4,599,116 | 7/1986 | King . |
| 4,617,068 | 10/1986 | King . |
| 4,650,526 | 3/1987 | Claffey . |
| 4,656,097 | 4/1987 | Claffey . |
| 4,886,590 | 12/1989 | Tittle . |
| 4,950,610 | 8/1990 | Tittle . |
| 4,981,729 | 1/1991 | Zaleski . |
| 4,986,977 | 1/1991 | Peters . |
| 5,055,139 | 10/1991 | Personette ............... 134/22.17 |
| 5,061,389 | 10/1991 | Reichgott . |
| 5,110,494 | 5/1992 | Beck . |
| 5,200,114 | 4/1993 | Beck . |
| 5,218,031 | 6/1993 | Nayder . |
| 5,232,515 | 8/1993 | Sullivan ............... 134/38 |
| 5,252,614 | 10/1993 | Sisson ............... 521/48 |
| 5,259,960 | 11/1993 | Beck . |
| 5,286,300 | 2/1994 | Hnatin . |
| 5,300,541 | 4/1994 | Nugent, Jr. et al. ............... 523/414 |
| 5,380,468 | 1/1995 | Gober . |
| 5,385,655 | 1/1995 | Brent . |
| 5,399,433 | 3/1995 | Kobler ............... 521/48 |
| 5,414,021 | 5/1995 | Eddy ............... 521/48 |
| 5,438,109 | 8/1995 | Nugent, Jr. et al. ............... 525/526 |
| 5,472,512 | 12/1995 | Gober . |
| 5,491,204 | 2/1996 | Nugent, Jr. et al. ............... 525/523 |
| 5,603,818 | 2/1997 | Brent et al. . |
| 5,634,989 | 6/1997 | Hashimoto et al. . |
| 5,711,996 | 1/1998 | Claffey . |
| 5,746,837 | 5/1998 | Beck et al. . |
| 5,753,316 | 5/1998 | Brent et al. . |
| 5,840,772 | 11/1998 | Peters . |

FOREIGN PATENT DOCUMENTS

| | | |
|---|---|---|
| 0 637 617 | 2/1995 | European Pat. Off. . |
| 19531886 | 3/1997 | Germany . |
| WO98/12249 | 3/1998 | WIPO . |

OTHER PUBLICATIONS

Anonymous: "Separation of Polyvinylidene Chloride Copolymer Coating from Oriented Polyester Substrates", Research Disclosure, vol. 212, No. 31, Dec. 1981.

*Primary Examiner*—James J. Seidleck
*Assistant Examiner*—Olga Asinovsky
*Attorney, Agent, or Firm*—Kenneth J. Stachel; Ann M. Cannoni

[57] ABSTRACT

In one embodiment, the present invention relates to a method of separating a coating from a base plastic in a multilayered structure, comprising the steps of (A) providing the multilayered structure comprising at least a coating and a base plastic; (B) contacting the multilayered structure with a mixture comprising (i) a major amount of water, (ii) at least one basic compound or acid compound, (iii) at least one lifting agent, and (iv) at least one accelerator; and (C) separating the coating from the base plastic. In another embodiment, the present invention relates to a separating composition containing a major amount of water, at least one basic compound or acid compound, at least one lifting agent, and at least one accelerator. The inventive methods and compositions overcome numerous problems in the art by enabling the efficient recycling of coated polymer articles whereby clear and/or colorless recycled polymers may be obtained.

18 Claims, 1 Drawing Sheet

METHODS OF RECYCLING AND COMPOSITIONS USED THEREIN

This is a divisional of U.S. patent application Ser. No. 08/715,603, filed Sep. 18, 1996, now U.S. Pat. No. 5,840,772.

FIELD OF THE INVENTION

The present invention relates to a method of separating polymer layers of a multilayered structure, a method of recycling coated polymer articles and compositions used in the methods.

BACKGROUND OF THE INVENTION

Plastics are used in diverse applications including containers, clothing, carpet materials, fiberfill and a multitude of other applications. In order to enhance the performance of plastics in certain applications, a coating may be applied to the plastic. A plastic may be coated to improve its strength, its permeability or another characteristic. For example, a barrier coating can be applied to thin walled plastic food and beverage containers thereby decreasing the permeability of the plastic to gas, such as carbon dioxide gas or oxygen gas. This is because food and beverage containers have a relatively short shelf life due to the entry of oxygen and loss of carbonation through the thin container walls. Barrier coated food and beverage containers exhibit a 10 to 30 fold shelf life increase over uncoated containers.

For several reasons, including cost effectiveness and environmental concerns, plastics are recycled. However, plastics having a coating cannot be efficiently recycled in some instances. This is particularly apparent for plastics having a barrier coating because the barrier-coated plastic becomes discolored or unclear upon melting. Recycled plastic which is discolored or unclear cannot be used to produce clear, colorless fibers, containers or other products unless they are subjected to extensive and additional processing. As a result, there is a need to remove coatings from plastic prior to recycling.

SUMMARY OF THE INVENTION

In one embodiment, the present invention relates to a method of separating a coating from a base plastic in a multilayered structure, comprising the steps of (A) providing the multilayered structure comprising at least a coating and a base plastic; (B) contacting the multilayered structure with a mixture comprising (i) a major amount of water, (ii) at least one basic compound or acid compound, (iii) at least one lifting agent, and (iv) at least one accelerator; and (C) separating the coating from the base plastic. In another embodiment, the present invention relates to a separating composition containing a major amount of water, at least one basic compound or acid compound, at least one lifting agent, and at least one accelerator.

In yet another embodiment, the present invention relates to a method of recycling coated polymer containers including the steps of providing a polymer container having a polymer coating, preparing flakes from the coated polymer container, contacting the flakes with a mixture containing a major amount of water, at least one basic compound or acid compound, at least one lifting agent and at least one accelerator, and separating the mixture and the polymer coating from the flakes. The flakes may be extruded into polymer articles suitable for use as food or beverage containers.

The inventive compositions and methods overcome numerous problems in the art by enabling the efficient recycling of coated polymer articles whereby clear and/or colorless recycled polymers may be obtained.

DETAILED DESCRIPTION

Figure 1:
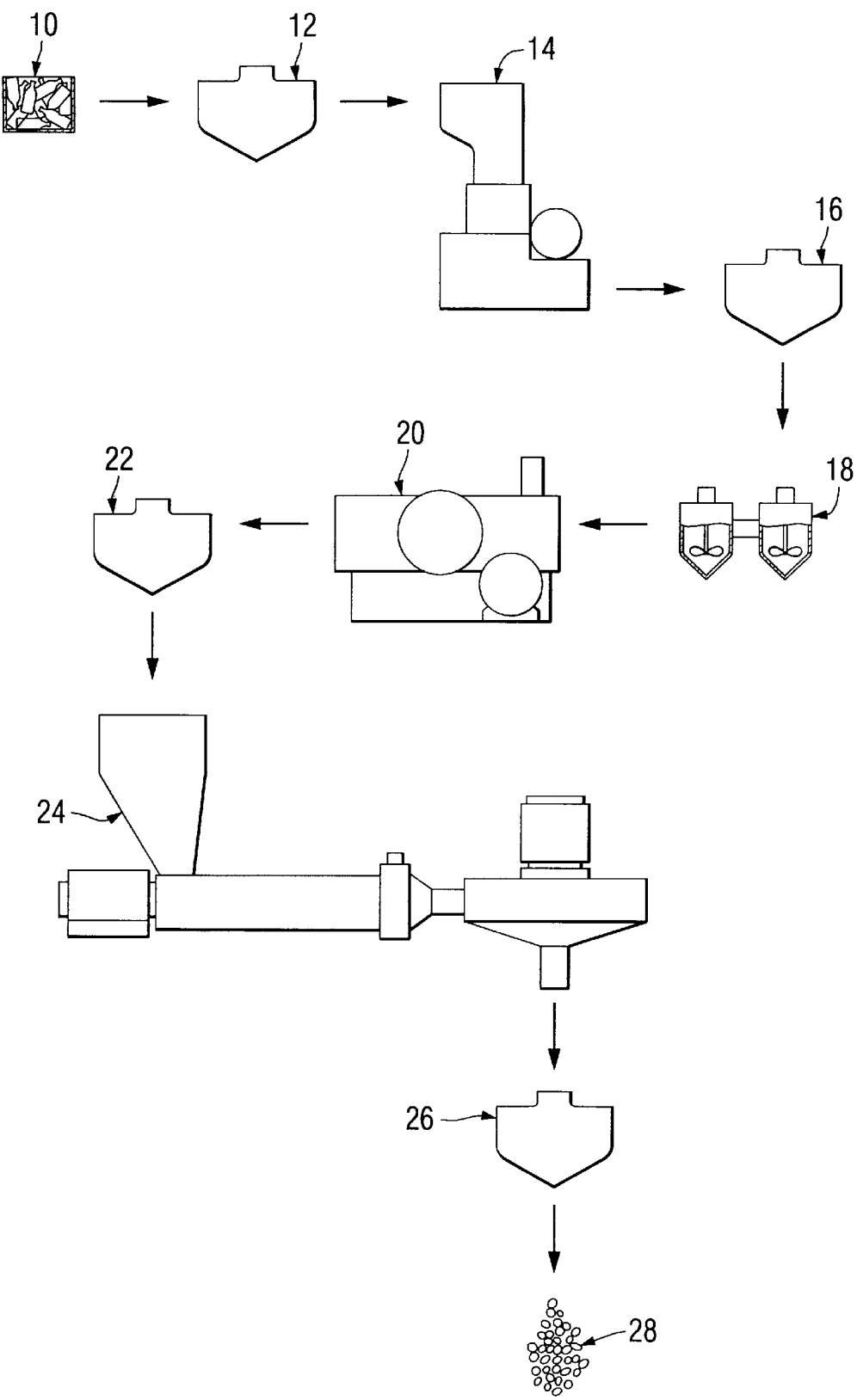
FIG. 1 is a general representation of a method of recycling coated polymer articles according one embodiment of the invention.

In the following description, a number of features and parameters are described, defined and/or exemplified with one or more numerical values in a range. Any combination of the values of the ranges described herein may be used. For instance, the higher value of one specific range may be combined with the lower value of another specific range to describe an additional range of values.

The term "hydrocarbyl" includes hydrocarbon as well as substantially hydrocarbon groups. Substantially hydrocarbon describes groups which contain heteroatom substituents which do not alter the predominantly hydrocarbon nature of the group. Examples of hydrocarbyl groups include the following:

(1) hydrocarbon substituents, i.e., aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, i.e., those substituents containing non-hydrocarbon groups which, in the context of this invention, do not alter the predominantly hydrocarbon nature of the substituent; those skilled in the art will be aware of such groups (e.g., halo (especially chloro and fluoro), hydroxy, mercapto, nitro, nitroso, sulfoxy, etc.);

(3) heteroatom substituents, i.e., substituents which, while having a predominantly hydrocarbon character within the context of this invention, contain an atom other than carbon present in a ring or chain otherwise composed of carbon atoms (e.g., alkoxy or alkylthio). Suitable heteroatoms will be apparent to those of ordinary skill in the art and include, for example, sulfur, oxygen, nitrogen and such substituents as, e.g., pyridyl, furyl, thienyl, imidazolyl, etc.

In general, no more than about 2, preferably no more than one, hetero substituent will be present for every ten carbon atoms in the hydrocarbyl group. Typically, there will be no such hetero atom substituents in the hydrocarbyl group. Therefore, the hydrocarbyl group is purely hydrocarbon.

In one embodiment, the invention relates to a method of separating a coating from a base plastic in a multilayered structure. The coating may have more than one layer. The coating may have multiple layers, sometimes up to 5 or more layers. The layers may include ink, adhesive, etc. as well as layers derived from polymers. The method involves the steps of contacting the multilayered structure with a mixture containing a major amount of water, at least one basic compound or acid compound, at least one lifting agent, and at least one accelerator, and separating the coating from the base plastic. In one embodiment, the method uses a mixture containing a major amount of water, at least one acid compound and at least one lifting agent. In a specific embodiment, the invention relates to a method of removing a coating involving the steps of providing a coated article, contacting the coated article with a mixture containing a major amount of water, at least one basic compound or acid compound, at least one lifting agent, and at least one accelerator, and removing the mixture and the coating from the polymer article.

The multilayered structure is any structure containing at least one coating and at least one base plastic. The multilayered structure may or may not contain: additional polymer layers, and/or additional non-polymer layers. Although in a preferred embodiment the coating and base plastic are next to each other, it is not necessary that the coating and base plastic are in direct contact with each other. For example, an adhesive layer or pigment layer may be interposed between the coating and base plastic.

The coatings for polymer articles, including barrier coatings, are generally polymers. In one embodiment, the multilayered structure is a coated plastic container where the coating is a barrier coating and particularly a gas barrier coating which prevents the loss of carbonation of a carbonated beverage contained in a plastic container. In another embodiment, the multilayered structure is a plastic container containing at least one coating which is a gas barrier polymer layer that prevents oxygen or other gases from entering into the plastic container. In yet another embodiment, the multilayered structure is a plastic container containing at least one coating which is a barrier coating that prevents light, such as ultraviolet light, from entering into the plastic container. In still another embodiment, the multilayered structure is a plastic container containing at least one coating which is a coating that provides additional strength and scuff and/or mar-resistance to the plastic container.

The coating may generally be based on thermoplastic or crystalline resins. Specific coatings may be derived from polyvinylidine chloride copolymer, lower alkyl (such as methyl or ethyl) acrylate/acrylonitrile copolymer, a copolymer containing an acrylic and methacrylic monomer therein, a polymer or copolymer containing ethlenically unsaturated monomer, vinylidine chloride/acrylonitrile copolymer, vinylidine chloride/acrylonitrile/methacrylonitrile copolymer, vinylidine chloride/methacrylonitrile copolymer, vinylidine chloride/acrylonitrile/glycidyl acrylate copolymer, vinylidine chloride/acrylonitrile/glycidyl methacrylate copolymer, vinylidine chloride/acrylonitrile/acrylic monoglyceride copolymer, vinylidine chloride/ethylacrylate/glycidyl acrylate copolymer, vinylidine chloride/methyl methacrylate/ styrene copolymer, vinylidine chloride/acrylonitrile/styrene copolymer, vinylidine chloride/acrylonitrile/ trichloroethylene copolymer, vinylidine chloride/ acrylonitrile/vinylchloride copolymer, vinylidine chloride/ acrylonitrile/methacrylic monoglyceride/trichloroethylene copolymer, vinylidine chloride/methoxyethylacrylate/ methylacrylate/trichloroethylene copolymer, styrene/ butadiene, styrene/alkylacrylate copolymer, alkyl and/or aryl esters of unsaturated carboxylic acids such as acrylates and methacrylates, unsaturated nitriles such as acrylonitrile and/or methacrylonitrile, vinylhalides such as vinylchloride and vinylbromide, vinylidine chloride and vinylacetate. Other monomers which may be included to form barrier coating polymers include vinylchloride, acrylates, methacrylates, unsaturated organic acids such as acrylic methacrylic itaconic and fumaric acids. In another embodiment, the coating is a barrier coating derived from polyvinylidine chloride. These coatings are generally described in U.S. Pat. No. 4,573,429, issued to Cobbs, Jr. et al., the content of which is hereby incorporated herein by reference. Coatings may also be derived from ethylene-vinyl alcohol.

Additional examples of coatings include those derived from a polymeric reaction product of a polyamine and polyepoxide. The coating may also be derived from the reaction product of a polyamine, an alkanolamine, and a polyepoxide. The polyepoxides may be saturated or unsaturated, aliphatic, cycloaliphatic, aromatic, or heterocyclic and may be substituted or unsubstituted, with noninterfering substituents such as hydroxyl groups or the like. Examples of polyepoxides include polyglycidyl, ethers of aromatic polyols and polyglycidyl ethers of polyhydric aliphatic alcohols. The polyepoxide may have an average 1,2-epoxy functionality of at least 1.4 (specifically including diepoxides). For example, a polyepoxide may be derived from a diglycidyl ether of an aromatic polyol such as bisphenol A or an aliphatic alcohol such as 1,4-butanediol. Trifunctional and tetrafunctional polyepoxides may also be used. Also within the scope of polyepoxides are polyoxalates or other suitable polycarboxylates. Polyamines include aliphatic polyamines, aromatic polyamines, ketone blocked polyamines, polyethyleneimines and polyoxyalkaline-polyamines. These polymer layers or coatings are generally described in U.S. Pat. Nos. 5,300,541, 5,438,109 and 5,491,204 each issued to Nugent, Jr. et al., the contents of which are hereby incorporated herein by reference.

The base plastic may be one or more layers. The base plastic may include pigments, adhesive, etc. In one embodiment, the base plastic is free of pigments. The base plastic may be derived from polyolefins such as high and low density polyethylene and/or polypropylene, polystyrene and styrene/acrylonitrile copolymers, polyvinyl chloride, vinyl chloride copolymers, polycarbonates, polyacetals, polyamides and polyesters such poly(glycol terephthalates). Additional polymers include those made from a melt-moldable thermoplastic resin by injection molding, blow molding, biaxially drawing blow molding or draw forming and the like. In this connection, the polymer article of the barrier-coated polymer article may be made of, for example, low density polyethylene, medium density polyethylene, high density polyethylene, polypropylene, olefin-type copolymers such as ethylene/propylene copolymers, ethylene/butene copolymers, ionomers, ethylene/vinyl acetate copolymers and ethylene/vinyl alcohol copolymers, polyesters such as polyethylene terephthalate (PET), polybutylene terephthalate and polyethylene terephthalate/ isophthalate, polyamides such as Nylon-6, Nylon-6,6 and Nylon-6,10, polystyrene, styrene-type copolymers such as styrene/butadiene block copolymers, styrene/acrylonitrile copolymers, styrene/butadiene/acrylonitrile copolymers (ABS resins), polyvinyl chloride, vinyl chloride-type copolymers such as vinyl chloride/vinyl acetate copolymers, polymethyl methacrylate and acrylic copolymers such as methyl methacrylate/ethylacrylate copolymers, polycarbonate, combinations thereof and the like. In a preferred embodiment, the base plastic is polyethylene terephthalate (PET), polyethylene or polypropylene.

Methods of separating a coating from a base plastic and in particular a barrier-coating from a polymer article involve contacting the multilayered structure or coated polymer article (or flakes therefrom) with the composition described more fully below. The coating is physically separated from the base plastic. In the embodiment of a polymer article, the coating is physically separated from the polymer article or flakes therefrom.

The multilayered structure may be subject to one or more pretreatment steps. For instance, the multilayered structure may be cleaned, dried, heated, cooled and/or pretreated with an activating compound such as a mild acidic or basic solution rinsing treatment. Non-plastic debris, such as dirt, adhesives, metal contaminants, and/or paper contaminants, may be removed from the multilayered structures or flakes therefrom. In one specific embodiment, plastic labelling may also be removed from the coated polymer articles or flakes therefrom. Alternatively or additionally, the multilayered structure may be granulated into flakes or small pieces. Hereinafter, when appropriate, reference to the multilayered structure also includes reference to flakes obtainable from the multilayered structure. The size of the flakes depends upon the granulating conditions used. Flake size is not critical to the invention. Cleaning the multilayered structure may be accomplished by one or more of the following steps. The multilayered structure may be subjected to a steam treatment in an aspirator, washed with cold and/or hot water and/or cleaning solution and/or dried. Washing is especially effective for removing label contaminants and/or residual adhesives.

The multilayered structure is contacted with a separating composition containing a major amount of water, at least one basic compound or acid compound, at least one lifting agent, and at least one accelerator. Contacting the multilayered structure with the separating composition may be accomplished by spraying, flooding, wiping or immersing or otherwise bringing the multilayered structure into contact with the separating composition.

The multilayered structure is contacted with the separating composition for a time sufficient to separate the coating from the base plastic. This time will vary depending on a number of factors including the composition of the coating and base plastic, the composition of any other layer, temperature, the presence or absence of any pretreatment steps including precleaning steps, the relative size and form (for example, flaked or unflaked form) of the multilayered structure, the relative thickness or relative amount of the coating compared to the base plastic or compared to the remaining portion of the multilayered structure, and the like. During or just prior to contact, the separating composition may be agitated to increase the uniformity of the concentration of the individual components present in the separating composition at various locations around the multilayered structure. Agitation may be accomplished by shaking, stirring, vibrating by mechanical or high-frequency ultrasonic sound waves.

In one embodiment, the multilayered structure is in contact with the separating composition from about 10 seconds to about 4 hours. In another embodiment, the contact time is from about 20 seconds to about 2 hours. In a preferred embodiment, the contact time is from about 30 seconds to about 60 minutes. In a most preferred embodiment, contact time is from about 10 minutes to about 40 minutes. The separating composition and one of the coatings are then separated from the base plastic of the multilayered structure. Although not wishing to be bound by any theory, it is believed the separating composition loosens, lifts and ultimately separates the coating from the base plastic.

Once the coating layer is physically separated from the base plastic or remaining portions of the multilayered structure, further separation and/or collection methods known to those skilled in the art can be implemented, for instance, using a separation tank such as a settling tank, a float-sink tank, and a hydrocyclone in addition to in-line filters. In the embodiment of a coated polymer article immersed in the separating composition, the coating is separated from the polymer article, and the coating or the polymer article can be further separated and/or collected using methods known to those skilled in the art. Other methods which further separate different plastics, especially when both plastics are physically separated yet in the same solution, can be used. Various properties of the individual polymer layers, such as size, specific gravity, density and the like, provide the basis for further separation after initial separation is achieved.

Once the coating layer is further separated from the base plastic or remaining portion of the multilayered structure containing the base plastic and collected, drying may be implemented. Drying may be accomplished by mechanical drying or high temperature drying.

Either or both of the isolated polymer layers can be subjected to additional processing. For instance, in the embodiment of a coated polymer article, the polymer article from which the coating has been removed can be subsequently used in various recycling processes. In particular, the polymer article from which the coating has been removed may be recycled into beverage containers, food containers, other containers, clothing, carpet materials, and fiberfill. Various recycling methods are known by those skilled in the art and may include extrusion.

Referring to FIG. 1, an embodiment of a method of separating coating from a base plastic of a multilayered structure, and subsequently processing base plastic is illustrated. In particular, a method of recycling polymer articles having a polymer coating is illustrated. Coated polymer articles 10 are optionally washed in a washing system 12 which may involve immersing in hot and/or cold water and then fed to a granulator 14 which converts the coated polymer articles into coated polymer flakes. The coated polymer flakes are again optionally cleaned in a washing system 16 which may involve immersing in hot and/or cold water. The coated polymer flakes are transferred to a separation system 18 where they are immersed in a separating composition containing a major amount of water, at least one basic compound or acid compound, at least one lifting agent, and at least one accelerator. The separation system 18 may contain a means for contacting the coated polymer flakes with the separating composition and a filtering means to further physically separate the coating from the polymer flakes thereby facilitating subsequent collection of the polymer flakes. For example, the separating composition containing the coated polymer flakes may contain a spinning or centerfuge mechanism which spins components, where the relatively heavy components, such as the polymer flakes, sink to the bottom so that they may be collected. As a result, the coating is substantially or completely separated from the polymer flakes, and the polymer flakes are transferred to a dryer 20. The polymer flakes, substantially free of the coating, may be optionally washed again in a washing system 22, and then are introduced to an extruder 24 which produces recycled polymer in any desired form, such as in pelletized form, from the polymer flakes. The recycled polymer may be washed again in a washing system 26 and then collected as clean recycled polymer pellets 28. Although a number of washing steps are described, each washing step is optional so that the entire separating and recycling process may involve none, one, two, three or four or even more washing steps strategically located throughout the process. If two or more washing steps are used, each individual washing step may be the same or different from each other washing step.

The separating composition for contacting the multilayered structure contains a major amount of water. In one embodiment, the separating composition contains greater than about 60% by weight of water. In another embodiment, the separating composition contains greater than about 70% and less than about 99% by weight of water. In a preferred embodiment, the separating composition contains greater than about 75% by weight of water. In a more preferred embodiment, the separating composition contains about 75% to about 95% by weight of water. The water used may be tap water, purified water, or deionized water.

The separating composition for contacting the multilayered structure contains at least one basic compound or at least one acid compound. In this sense, the separating composition contains at least one pH modifier. The pH modifier, which may be a basic compound or an acid compound, either increases or decreases the pH of the generally aqueous inventive composition. In the embodiments involving a basic compound, the pH of the inventive composition is greater than about 7.5. In another embodiment, the pH of the inventive composition is greater than about 8.5, and more preferably greater than about 9. In the embodiments involving an acid compound, the pH of the inventive composition is less than about 6.5. In another embodiment, the pH of the inventive composition is less than about 5.5, and more preferably less than about 5.

In one embodiment, the separating composition for contacting the multilayered structure contains at least one basic compound. As used herein, the term "basic compound" is intended to include alkali metal, alkaline earth metal and ammonium hydroxides, silicates, phosphates, borates, carbonates, and mixtures thereof, and amines and mixtures thereof. For example, the basic compound includes alkali metal hydroxides, alkaline earth metal hydroxides, ammonium hydroxides, alkali metal silicates and so on. In one embodiment, the basic compound is "dry" or substantially anhydrous.

Alkali metals include lithium, sodium, potassium, rubidium and cesium. Alkaline earth metals include beryllium, magnesium, calcium, strontium, and barium. Ammonium ions include quaternary ammonium ions represented by Formula (I):

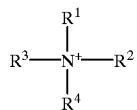

(I)

where $R^1$ to $R^4$ are individually selected from hydrogen and alkyl groups containing 1 to about 5 carbon atoms, and hydroxyalkyl containing 1 to about 5 carbon atoms. In a preferred embodiment, $R^1$ to $R^4$ are each hydrogen, methyl or ethyl.

Specific basic compounds include sodium tetraborate, sodium carbonate, sodium bicarbonate, sodium hydroxide, sodium phosphate, sodium pyrophosphate and other polyphosphates, sodium silicate, potassium carbonate, potassium bicarbonate, potassium hydroxide, potassium phosphate, potassium pyrophosphate and other polyphosphates, ammonium carbonate, ammonium hydroxide, ammonium hydrogen phosphate, ammonium phosphate, calcium carbonate, calcium hydroxide, calcium phosphate, calcium pyrophosphate, calcium silicate, magnesium carbonate, magnesium hydroxide, magnesium phosphate, magnesium pyrophosphate, magnesium silicate, or mixtures of two or more thereof.

Amines include aliphatic amines, cycloaliphatic amines, aromatic amines and heterocyclic amines. The amine may be a primary, secondary or tertiary amine. In a preferred embodiment, the amine is a tertiary amine. The amine may be a monoamine, diamine or polyamine. In another embodiment, the amine is a hydroxyamine. When the amine is a hydroxyamine, non-hydroxy substituents on the amine nitrogen, when present, may individually be hydrocarbyl groups containing 1 to about 8 and preferably 1 to about 5 carbons atoms. Examples of hydroxyamines include hydroxyamines having one or more hydroxyalkyl groups each having 1 to about 8 carbon atoms, and preferably 1 to about 5 carbon atoms such as hydroxymethyl, hydroxyethyl and hydroxybutyl groups. Specific examples of hydroxyamines include mono-, di- and tri-ethanolamine, 3-amino-1-propanol, 2-amino-2-methyl-1-propanol, 2-amino-2-ethyl-1,3-propanediol, tris(hydroxymethyl) aminomethane, N-methylethanolamine, 2-diethylamino-2-methyl-1-propanol and triethanolamine. In a most preferred embodiment, the amine is triethanolamine.

Preferred basic compounds include potassium hydroxide, sodium hydroxide, ammonium hydroxide and triethanolamine. In one embodiment, the inventive composition contains the basic compound in an amount from about 1% to about 25% by weight. In a preferred embodiment, the inventive composition contains the basic compound in an amount from about 5% to about 20% by weight.

In one embodiment, the inventive composition for contacting the barrier-coated article or flakes therefrom contains at least one acid compound. As used herein, the term "acid compound" is intended to include organic acids such as carboxylic acids containing 1 to about 50 and preferably about 2 to about 12 carbon atoms and inorganic acids such as mineral acids.

Specific examples of inorganic acids include nitric acid, halogen acids such as hydrofluoric acid, hydrochloric acid, hydrobromic acid and hydriotic acid, sulfuric acid, sulfurous acid, perchloric acid, boric acid and phosphorous acids such as phosphorous acid and phosphoric acid. Of these inorganic acids, phosphoric acid is preferred.

Organic acids include carboxylic acids and polycarboxylic acids such as alkanoic acids, including formic acid, acetic acid, propionic acid, butyric acid and so on (generally containing 1 to about 10 carbon atoms), dicarboxylic acids, such as oxalic acid, malonic acid, succinic acid and so on (generally containing 1 to about 12 carbon atoms), hydroxyalkanoic acids, such as citric acid (generally containing 1 to about 10 carbon atoms), organic phosphorous acids such as dimethylphosphoric acid and dimethylphosphinic acid, sulfonic acids such as hydrocarbylsulfonic acids (containing 1 to about 20 carbon atoms) including methanesulfonic acid, ethanesulfonic acid, 1-pentanesulfonic acid, 1-hexanesulfonic acid, 1-heptanesulfonic acid, aromatic sulfonic acids such as benzenesulfonic acid, tolulenesulfonic acid, etc. Moreover, in some embodiments, two or more of any of the above-described acids may be used. Preferred organic acids include acetic acid and citric acid. In one embodiment, the inventive composition contains the acid compound in an amount from about 1% to about 25% by weight. In a preferred embodiment, the inventive composition contains the acid compound in an amount from about 5% to about 20% by weight.

The separating composition for contacting the multilayered structure contains at least one lifting agent. The lifting agent is preferably any compound capable of lifting one polymer layer away from another polymer layer. In a preferred embodiment, the lifting agent is a surfactant. The lifting agent may be present in the separating composition in an amount from about 0.001% to about 5% by weight. In a preferred embodiment, the lifting agent is present in the separating composition in an amount from about 0.005% to about 1% by weight. In an even more preferred embodiment, the lifting agent is present in the separating composition in an amount from about 0.01% to about 0.1% by weight.

Examples of lifting agents which may be included in the separating composition for contacting the multilayered structure include anionic, cationic, nonionic and amphoteric surfactants. These surfactants are known in the art, and many of these surfactants are described in McCutcheon's "Volume I: Emulsifiers and Detergents", 1995, North American Edition, published by McCutcheon's Division MCP Publishing Corp., Glen Rock, N.J., and in particular, pp. 1–232 which describes a number of anionic, cationic, nonionic and amphoteric surfactants and is hereby incorporated by reference for the disclosure in this regard. Examples of useful lifting agents include fluorocarbon surfactants, sulfosuccinate surfactants, alkloxylated alcohols, alkyoxylated phenols, polyoxyalkylene glycols, phosphate esters, aromatic sulfonates, diphenylsulfonates, alkoxylated alkyl aromatics and mixtures thereof.

In a preferred embodiment, especially the embodiments involving a basic compound, the lifting agent is an anionic surfactant or a cationic surfactant. In another embodiment, the lifting agent is a fluorocarbon surfactant, and preferably, an anionic fluorocarbon surfactant.

In a preferred embodiment, especially the embodiments involving an acid compound, the lifting agent is a nonionic surfactant. In another embodiment, especially the embodiments involving an acid compound, the lifting agent is an alkoxylated alkylaromatic surfactant.

Fluorocarbon surfactants, such as metal or ammonium fluorocarbon sulfonates or carboxylates, are commercially available from the 3M Company under the general trade designation "Fluorad" and from DuPont under the general trade designation "Zonyl." Specific Fluorad surfactants include potassium fluorinated alkyl carboxylates, ammonium perfluoro alkyl sulfonates, potassium perfluoro alkyl sulfonates, amine perfluoro alkyl sulfonates, and ammonium perfluoro alkyl carboxylates. Fluorocarbon surfactants include alkali metal, ammonium and amine fluorinated alkyl sulfonates and carboxylates. Specific Fluorad surfactants include those under the designation FC-109, FC-121, FC-93, FC-95, FC-98, FC-99, FC-120, FC-129 and FC-143. Specific Zonyl surfactants include Zonyl FSA, Zonyl FSE, Zonyl FSJ, Zonyl FSP, Zonyl NF, Zonyl RP, Zonyl TBS and Zonyl UR.

In another embodiment, the lifting agent is a sulfosuccinate surfactant or a derivative thereof such as a hydrocarbyl substituted sulfosuccinate where each hydrocarbyl group contains 1 to about 24 and preferably 1 to about 12 carbon atoms. In a preferred embodiment, the lifting agent is an anionic sulfosuccinate surfactant or a derivative thereof. Sulfosuccinates include alkali metal alkyl sulfosuccinates where the alkyl group contains 1 to about 24 and preferably 1 to about 12 carbon atoms such as sodium dioctyl sulfosuccinates. Sulfosuccinate surfactants are commercially available from Union Carbide under the general trade designation "Triton®" and specifically Triton® GR-5M and Triton® GR-7M.

In another embodiment, the lifting agent is a modified alkoxylated surfactant. In a preferred embodiment, the lifting agent is an anionic modified ethoxylate surfactant. Modified alkoxylated surfactants include alkoxylated alcohols, and alkoxylated phenols. In one embodiment, the alkoxylated alcohol includes ethoxylated and propoxylated alcohols having from 1 to about 30 carbon atoms, or from about 4 to about 24 carbon atoms, or from about 6 to about 18 carbon atoms. These materials may be prepared by reacting an alcohol with an alkylene oxide such as ethylene oxide or propylene oxide. Modified ethoxylates surfactants are ethoxylated alcohols commercially available from Union Carbide under the general trade designation "Triton®", and specifically Triton® DF-12, DF-16, DF-18, and DF-20.

In another embodiment, the lifting agent is hydrocarbylphenol alkoxylate, such as an alkylphenol ethoxylate surfactant. The hydrocarbyl group may contain 1 to about 24 and preferably 2 to about 18 carbon atoms. The hydrocarbylphenol alkoxylates include alkylphenol ethoxylates and propoxylates. Examples of alkylphenol alkoxylates include octylphenoxy polyethoxyethanol and nonylphenol ethoxylate. These materials are available from Union Carbide under the trade designation Triton®, N-42, N-57 and N-101. An alkylphenol ethoxylate surfactant may be an anionic surfactant or a nonionic surfactant. Specific examples include alkylpolyethylene glycol ether acetic acid, and ethoxylate anionic complexes. Specific compounds are commercially available from Sandoz Chemicals under the general trade designation "Sandopan" and from Hulls America under the general trade designation "Marlowet."

In another embodiment, the surfactant is a polyoxyalkylene glycol. Polyoxyalkylene glycols include polyoxyethylene and polyoxypropylene glycols. Examples of these materials are available from Union Carbide under the tradename Carbowax® Peg 300, 600, 1000 and 1450, and NIAX 425 and 1025.

In another embodiment, the lifting agent is a phosphate ester surfactant such as an alkali metal phosphate. In a preferred embodiment, the lifting agent is an anionic phosphate ester surfactant where the ester hydrocarbyl moiety each independently containing 1 to about 24 and preferably 1 to about 12 carbon atoms. In another preferred embodiment, the surfactant is the potassium salt of a phosphate ester. Examples of commercially available phosphate ester surfactants include those from Union Carbide under the trade designation "Triton®", and specifically Triton® H-55 and Triton® H-66.

In another embodiment, the lifting agent is an aromatic sulfonate surfactant, such as a naphthalene sulfonate or hydrocarbyl substituted naphthalene sulfonate surfactant, a benzene or hydrocarbyl substituted benzene sulfonate surfactant, an anthracene or hydrocarbyl substituted anthracene sulfonate and a phenyl or hydrocarbyl substituted phenyl sulfonate. In each case, the hydrocarbyl group contains 1 to about 24 and preferably 1 to about 12 carbon atoms. In a preferred embodiment, the lifting agent is an anionic alkyl naphthalene sulfonate surfactant. Examples include naphthalene and alkyl naphthalene alkali metal sulfonates such as naphthalene and alkyl naphthalene sodium sulfonates. Specific alkyl naphthalene sulfonates commercially available include those from Witco under the general trade designation "Petro®" and from Henkel under the general trade designation "Sellogen."

In another embodiment, the lifting agent is a diphenyl sulfonate or derivative thereof. In a preferred embodiment, the lifting agent is an anionic diphenyl sulfonate surfactant or a hydrocarbyl substituted derivative thereof where the hydrocarbyl group contains 1 to about 24 and preferably 1 to about 12 carbon atoms. Specific examples include alkali metal alkyl diphenyl oxide disulfonates such as sodium hexyldiphenyloxide disulfonate, sodium decyldiphenyloxide disulfonate, dodecyldiphenyloxide disulfonic acid, sodium dodecyldiphenyloxide disulfonate, N-decyldiphenyloxide disulfonate, sodium n-decyldiphenyloxide disulfonate and sodium n-hexadecydiphenyloxide disulfonate. Diphenlysulfonate surfactants are commercially available from Dow under the general trade designation "Dowfax," and specifically include Dowfax C6L, C10L, 2AO, 2A1, 2A1-D, 2EP, 3BO, 3B2, 3B2-D, 2000, 8390, and 8390-D.

The separating composition for contacting the multilayered structure contains at least one accelerator. The accelerator, in combination with the other components of the composition, accelerates the separation of coating from base plastic in a multilayered structure and in one specific embodiment, a barrier coating from a polymer article. Suitable accelerators include glycol ethers, glycol ether acetates (which may be analogous to the glycol ethers discussed below), alkylene carbonates, glycerine, lactones and hydrocarbyl substituted lactones, pyrrolidones and hydrocarbyl substituted pyrrolidones, furan compounds and the like where the hydrocarbyl groups contain 1 to about 24 and preferably 2 to about 18 carbon atoms.

In one embodiment, glycol ethers include alkylene glycol mono- and di-alkyl ethers (where the alkyl and alkylene groups contain from 1 to about 12 and preferably 1 to about 8 carbon atoms). Glycol ethers specifically include ethylene, polyethylene such as diethylene, propylene, and polypropylene such as dipropylene glycol mono- and dialkylethers. Glycol ethers may be represented by

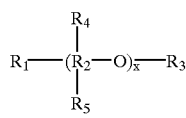

where $R_1$, $R_2$, $R_4$ and $R_5$ are each independently hydrogen or hydrocarbyl groups containing 1 to about 8 and preferably 1 to about 5 carbon atoms, $R_3$ is an alkylene group containing 1 to about 8 and preferably 1 to about 5 carbon atoms, and x is 1 to about 20 and preferably 1 to about 3. In particular, glycol ethers include ethylene glycol ethers, propylene glycol ethers, butylene glycol ethers, di(ethylene glycol) ethers, di(propylene glycol) ethers, di(butylene glycol) ethers, tri(ethylene glycol) ethers, tri(propylene glycol) ethers, tri(butylene glycol) ethers and other poly(ethylene, propylene or butylene) glycol ethers. Glycol ethers also include ethylene, polyethylene, propylene and polypropylene mono- and diphenylethers such as ethylene glycol mono phenyl ether.

Specific examples of glycol ethers include ethylene glycol methyl ether, ethylene glycol methylbutyl ether, ethylene glycol ethylbutyl ether, ethylene glycol ethyl ether, ethylene glycol butyl ether, ethylene glycol dimethyl ether, ethylene glycol diethyl ether, ethylene glycol dibutyl ether, propylene glycol methyl ether, propylene glycol ethyl ether, propylene glycol butyl ether, propylene glycol dimethyl ether, propylene glycol diethyl ether, propylene glycol dibutyl ether, di(ethylene glycol) methyl ether, di(ethylene glycol) ethyl ether, di(ethylene glycol) butyl ether, di(ethylene glycol) hexyl ether, di(ethylene glycol) dimethyl ether, di(ethylene glycol) diethyl ether, di(ethylene glycol) dibutyl ether, di(ethylene glycol) butylmethyl ether, di(ethylene glycol) dodecyl ether, di(propylene glycol) methyl ether, di(propylene glycol) butyl ether, tri(ethylene glycol) methyl ether, tri(ethylene glycol) dimethyl ether, tri(propylene glycol) methyl ether, tri(propylene glycol) butyl ether, and mixtures thereof. Glycol ethers are available from Union Carbide under the name Cellosolve®, Dow Chemical under the name Dowanol® and Arco Chemical under the name Arcosolv. Preferred glycol ethers include propylene glycol butyl ether, di(ethylene glycol) butyl ether and di(propylene glycol) methyl ether.

Lactones and hydrocarbyl substituted lactones include alkyl lactones where the alkyl group contains 1 to about 8 carbon atoms, such as butyrolactone and gamma-butyrolactone. Pyrrolidones and hydrocarbyl substituted pyrrolidones include alkyl pyrrolidones where the alkyl group contains 1 to about 8 carbon atoms, such as N-methyl-2-pyrrolidone. Furan compounds include furfuryl alcohol, tetrahydrofurfuryl alcohol, and analogs thereof. Alkylene carbonates contain 1 to about 16 and preferably 1 to about 8 carbon atoms in the alkylene moiety and specifically include dimethyl carbonate, diethyl carbonate, ethylene carbonate and dipropyl carbonate.

Glycol ether acetates may be prepared by reacting acetic acid or a salt or derivative thereof with one or more of the glycol ethers described above. Glycol ether acetates generally include ethylene glycol ether acetates, propylene glycol ether acetates, butylene glycol ether acetates, di(ethylene glycol) ether acetates, di(propylene glycol) ether acetates, di(butylene glycol) ether acetates, tri(ethylene glycol) ether acetates, tri(propylene glycol) ether acetates, tri(butylene glycol) ether acetates and other poly(ethylene, propylene or butylene) glycol ether acetates. Glycol ether acetates specifically include ethylene glycol butyl ether acetate, propylene glycol methyl ether acetate, di(ethylene glycol) ethyl ether acetate and di(propylene glycol) methyl ether acetate.

The accelerator is present in the separating composition in an amount from about 1% to about 20% by weight. In a preferred embodiment, the accelerator is present in the separating composition in an amount from about 2% to about 15% by weight. In a most preferred embodiment, the accelerator is present in the separating composition in an amount from about 3% to about 10% by weight. In one embodiment, only one accelerator is present in the separating composition. In a preferred embodiment, at least two accelerators are present in the separating composition. In another embodiment, at least three accelerators are present in the separating composition. In another embodiment, one glycol ether is included in the separating composition with or without other accelerators. In another embodiment, at least two glycol ethers are included in the separating composition with or without other accelerators. In yet another embodiment, at least three glycol ethers are used in the separating composition with or without other accelerators. In one embodiment, the separating composition contains from about 1% to about 10% by weight of a glycol ether. In a preferred embodiment, the separating composition contains from about 2% to about 8% by weight of a glycol ether.

The separating composition may optionally include one or more of the following additives: rinse aids, water softeners, foamers, defoamers, and antifoamers. The additives may be present in the separating composition in an amount from about 0.001% to about 5% by weight. In a preferred embodiment, the additives are present in the separating composition in an amount from about 0.01% to about 1% by weight.

Antifoamers reduce or prevent the formation of stable foam and include silicones or organic polymers. Examples of these and additional antifoamers are described in "Foam Control Agents," by Henry T. Kerner (Noyes Data Corporation, 1976), pages 125, 162.

Defoamers are compounds which control the foaming tendencies of a composition. Examples of organic solvents which are effective defoamers include xylene, mesitylene, benzene, aromatic petroleum spirits, methyl isobutyl ketone, mineral spirits and mixtures thereof.

Foamers are additives which release gas to expand a given material by forming closed bubbles or cause frothing. Examples of foamers which may be incorporated into the separating composition for contacting a barrier-coated article or flakes therefrom include polyphosphates, EDTA, gluconates, citrates and the like.

The temperature at which the separating composition is used is any temperature effective to separate one polymer layer from another polymer layer. In one embodiment, the temperature of the separating composition is in the range from about 40° F. to about 212° F. In another embodiment, the temperature at which the separating composition is used is in the range from about 70° F. to about 210° F. In another embodiment, the temperature at which the separating composition is used is in the range from about 80° F. to about 200° F. In a preferred embodiment, the temperature at which the separating composition is used is in the range from about 100° F. to about 190° F.

While not intending to be limiting, the following examples illustrate the separating compositions and methods of using such compositions. Unless otherwise indicated in the following examples and elsewhere in the specification and claims, all parts and percentages are by weight, all temperatures are in degrees Centigrade, and pressure is at or near atmospheric pressure.

EXAMPLE 1

A composition is prepared containing 15 weight percent dry potassium hydroxide, 0.01 weight percent of a fluorinated alkyl carboxylate identified as Fluorad FC-109 from 3M, 0.02 weight percent of sodium dioctyl sulfosuccinate identified as Triton® GR-5M from Union Carbide, 2 weight percent of dipropylene glycol methyl ether, 2 weight percent propylene glycol n-butyl ether and the balance water. The temperature of the bath is maintained at about 150° F.

EXAMPLE 2

A composition is prepared containing 12 weight percent ammonium hydroxide, 0.8 weight percent ethylene glycol butyl ether acetate, 0.004 weight percent of a ammonium perfluoro alkyl sulfonate identified as Fluorad FC-121 from 3M, 0.002 weight percent of alkyl naphthalene sodium sulfonate identified as Petro® P from Witco, 1.5 weight percent of propylene glycol butyl ether, 2.7 weight percent ethylene glycol ethylbutyl ether and the balance water. The temperature of the bath is maintained at about 155° F.

EXAMPLE 3

A composition is prepared containing 18 weight percent sodium hydroxide, 0.007 weight percent of sodium hexyl-diphenyloxide disulfonate identified as Dowfax C6L from Dow Chemical, 0.04 weight percent of Triton® H-55 (a phosphate ester), 2.5 weight percent of diethylene glycol ethyl ether, 13.5 weight percent propylene glycol methyl ether acetate and the balance water. The temperature of the bath is maintained at about 175° F.

EXAMPLE 4

A composition is prepared containing 3 weight percent dry potassium hydroxide, 0.06 weight percent of a potassium fluorinated alkyl carboxylate identified as Fluorad FC-129 from 3M, 5 weight percent of gamma-butyrolactone, 6 weight percent propylene glycol dimethyl ether and the balance water. The temperature of the bath is maintained at about 110° F.

EXAMPLE 5

A composition is prepared containing 25 weight percent triethanolamine, 0.005 weight percent of an amine perfluoro alkyl sulfonate identified as Fluorad FC-99 from 3M, 0.2 weight percent of sodium dioctyl sulfosuccinate identified as Triton® GR-7M from Union Carbide, 0.09 weight percent of alkyl naphthalene sodium sulfonate identified as Petro® 11 from Witco, 1 weight percent of dipropylene glycol methyl ether, 1 weight percent N-methyl-2-pyrrolidone, 1 weight percent dipropyl carbonate and the balance water. The temperature of the bath is maintained at about 120° F.

EXAMPLE 6

A composition is prepared containing 5 weight percent dry potassium hydroxide, 2 weight percent potassium phosphate, 0.01 weight percent of Triton® DF-20 (an anionic modified ethoxylate), 0.4 weight percent of sodium dioctyl sulfosuccinate identified as Triton® GR-7M from Union Carbide, 1 weight percent of diethylene glycol methyl ether, 1 weight percent ethylene carbonate and the balance water. The temperature of the bath is maintained at about 200° F.

EXAMPLE 7

A composition is prepared containing 15 weight percent dry potassium hydroxide, 0.01 weight percent of a fluorinated alkyl carboxylate identified as Fluorad FC-109 from 3M, 0.02 weight percent of sodium dioctyl sulfosuccinate identified as Triton® GR-5M from Union Carbide, 2 weight percent of dipropylene glycol methyl ether, 2 weight percent propylene glycol n-butyl ether and the balance water. The temperature of the bath is maintained at about 190° F.

EXAMPLE 8

A composition is prepared containing 20 weight percent sodium borate, 1 weight percent of a fluorinated alkyl carboxylate identified as Fluorad FC-129 from 3M, 0.02 weight percent of sodium dioctyl sulfosuccinate identified as Triton® GR-7M from Union Carbide, 10 weight percent of dipropylene glycol methyl ether, and the balance water. The temperature of the bath is maintained at about 205° F.

EXAMPLE 9

A composition is prepared containing 2.5 weight percent citric acid, 0.2 weight percent of octylphenol ethoxylate identified as Delonic OPE-10 from DeForest Enterprises, 5 weight percent of di(ethylene glycol) butyl ether, and the balance water. The temperature of the bath is maintained at about 150° F.

EXAMPLE 10

A composition is prepared containing 2.5 weight percent phosphoric acid, 0.2 weight percent of an ethoxylated linear alcohol identified as Marlowet BL from Huls America, 5 weight percent of di(ethylene glycol) butyl ether, and the balance water. The temperature of the bath is maintained at about 150° F.

An example of a method of recycling multilayered structures and in particular, coated polymer articles, is described as follows. PET food and beverage containers coated with a gas barrier coating derived from polyamine, alkanolamine and polyepoxide are fed to a granulator which converts the coated PET containers into coated PET flakes. The coated PET flakes are cleaned in a washing system which involves sequentially immersing in hot and then cold water baths. The coated PET flakes are dried and transferred to a separation system where they are immersed in a composition according to Example 1 or 9 above. As a result, the gas barrier coating is substantially or completely separated from the PET flakes, and the PET flakes are filtered away from the separated coating and then transferred to a dryer. The PET flakes, substantially free of the gas barrier coating, are dried and then introduced to an extruder which produces recycled PET in pelletized form from the polymer flakes. The resultant PET pellets are substantially clear and do not exhibit extensive coloring or opaqueness.

Although the invention has been shown and described with respect to an exemplary embodiment thereof, it is obvious that equivalent alterations and modifications will occur to those skilled in the art upon reading and understanding the specification. The present invention includes all such equivalent alterations and modifications, and is limited only by the scope of the following claims.

What is claimed is:

1. A method of physically separating a gas barrier polymer coating from a base thermoplastic polymer in a multilayered structure, comprising the steps of:
   (A) providing the multilayered structure comprising at least one gas barrier polymer coating and at least one base thermoplastic polymer;
   (B) contacting the multilayered structure with a mixture comprising (i) a major amount of water, (ii) at least one basic compound, (iii) at least one lifting agent, and (iv) at least one accelerator selected from the group consisting of glycol ethers, glycol ether acetates, alkylene carbonates, glycerine, lactones, hydrocarbyl substituted lactones, pvrrolidones, hydrocarbyl substituted pyrrolidones, furan compounds and mixtures thereof, wherein the pH of the mixture of step (B) is greater than about 7.5; and
   (C) physically separating the gas barrier polymer coating from the base thermoplastic polymer.

2. The method of claim 1 wherein the multilayered structure is a beverage container or a food container.

3. The method of claim 1 wherein the multilayered structure is a polyethylene terephthalate container having a gas barrier polymer coating.

4. The method of claim 1 wherein the contacting of step (B) is accomplished by spraying, flooding or immersing the multilayered structure with the mixture.

5. The method of claim 1 wherein the basic compound is an alkali metal, alkaline earth metal or ammonium hydroxide, silicate, phosphate, borate, carbonate or mixtures thereof.

6. The method of claim 1 wherein the basic compound is selected from the group consisting of ammonium hydroxide, sodium hydroxide and potassium hydroxide.

7. The method of claim 1 wherein the multilayered structure is a flake.

8. The method of claim 1 wherein the lifting agent selected from the group consisting of fluorocarbon surfactants, sulfosuccinate surfactants, alkoxylated alcohols, alkoxylated phenols, polyoxyalkylene glycols, phosphate esters, aromatic sulfonates, diphenylsulfonates, alkoxylated alkyl aromatic surfactants and mixtures thereof.

9. The method of claim 1 wherein the accelerator is selected from the group consisting of an ethylene glycol ether, diethylene glycol ether, propylene glycol ether, or dipropylene glycol ether.

10. The method of claim 9 wherein the accelerator is selected from the group consisting of ethylene glycol methyl ether, ethylene glycol ethyl ether, ethylene glycol butyl ether, ethylene glycol dimethyl ether, ethylene glycol diethyl ether, ethylene glycol dibutyl ether, propylene glycol methyl ether, propylene glycol ethyl ether, propylene glycol butyl ether, propylene glycol dimethyl ether, propylene glycol diethyl ether, propylene glycol dibutyl ether, di(propylene glycol) methyl ether and mixtures thereof.

11. A composition having a pH greater than about 7.5 and comprising (i) a major amount of water, (ii) at least one basic compound selected from the group consisting of an alkaline earth metal hydroxide, alkaline earth metal silicate, alkaline earth metal phosphate, alkaline earth metal borate, alkaline earth metal carbonate, ammonium hydroxide, ammonium silicate, ammonium phosphate, ammonium borate, ammonium carbonate, alkali metal silicate, alkali metal phosphate, alkali metal borate, alkali metal carbonate and mixtures thereof, (iii) at least one lifting agent, and (iv) at least one accelerator selected from the group consisting of alkylene carbonates, glycerine, lactones and substituted lactones, pyrrolidones and substituted pyrrolidones, furan compounds and mixtures thereof.

12. The composition of claim 11 wherein the lifting agent is selected from the group consisting of fluorocarbon surfactants, sulfosuccinate surfactants, alkoxylated alcohols, alkoxylated phenols, polyoxyalkylene glycols, phosphate esters, aromatic sulfonates, diphenylsulfonates, alkoxylated alkyl aromatic surfactants and mixtures thereof.

13. The composition of claim 11 wherein water (i) is present in an amount greater than about 60% by weight, the basic compound (ii) is present in an amount from about 1% up to about 25% by weight, the lifting agent (iii) is present in an amount from about 0.001% up to about 5% by weight, and the accelerator (iv) is present in an amount from about 1% up to about 20% by weight.

14. A method of recycling coated polymer containers comprising the steps of
   (A) providing a polymer container having a polymer coating;
   (B) preparing flakes from the coated polymer container;
   (C) contacting the flakes with a mixture comprising (i) a major amount of water, (ii) at least one basic compound, (iii) at least one lifting agent and (iv) at least one accelerator selected from the group consisting of glycol ethers, glycol ether acetates, alkylene carbonates, glycerine, lactones and substituted lactones, pyrrolidones and substituted pyrrolidones, furan compounds and mixtures thereof; and
   (D) separating the mixture and the polymer coating from the flakes.

15. The method of claim 14 wherein the polymer container is a polyethylene terephthalate food or beverage container.

16. The method of claim 14 wherein the basic compound (ii) is an alkali metal, alkaline earth metal or ammonium hydroxide, silicate, phosphate, borate, carbonate or mixtures thereof.

17. The method of claim 14 further comprising the step of (F) extruding the flakes into a food or beverage container.

18. A method of physically separating a gas barrier polymer coating from a base thermoplastic polymer in a multilayered structure, comprising the steps of:
   (A) providing the multilayered structure comprising at least one gas barrier polymer coating and at least one base thermoplastic polymer, the gas barrier polymer coating comprising a gas barrier polymer selected from the group consisting of polymers formed from vinylhalides, acrylates, methacrylates, ethylenically unsaturated monomers, unsaturated nitriles, unsaturated organic acids, ethylene-vinyl alcohol, alkyl and/or aryl esters of unsaturated carboxylic acids and a polymeric reaction product of a polyamine and polyepoxide;

(B) contacting the multilayered structure with a mixture comprising (i) a major amount of water, (ii) at least one basic compound, (iii) at least one lifting agent, and (iv) at least one accelerator selected from the group consisting of glycol ethers, glycol ether acetates, alkylene carbonates, glycerine, lactones, hydrocarbyl substituted lactones, pyrrolidones, hydrocarbyl substituted pyrrolidones, furan compounds and mixtures thereof, wherein the pH of the mixture of step (B) is greater than about 7.5; and (C) physically separating the gas barrier polymer coating from the base thermoplastic polymer.

* * * * *